United States Patent
Lee

(10) Patent No.: US 7,077,434 B2
(45) Date of Patent: Jul. 18, 2006

(54) IMPACT ABSORPTION STRUCTURE OF A STEERING COLUMN COVER FOR A VEHICLE

(75) Inventor: Kwang Gi Lee, Gwangmyeong-si (KR)

(73) Assignee: Kia Motors Corporation, Seoul (KR)

( * ) Notice: Subject to any disclaimer, the term of this patent is extended or adjusted under 35 U.S.C. 154(b) by 288 days.

(21) Appl. No.: 10/751,023

(22) Filed: Dec. 31, 2003

(65) Prior Publication Data

US 2005/0046163 A1 Mar. 3, 2005

(30) Foreign Application Priority Data

Sep. 1, 2003 (KR) ............... 10-2003-0060684

(51) Int. Cl.
*B62D 1/16* (2006.01)
(52) U.S. Cl. .................................... 280/779
(58) Field of Classification Search ............... 280/779; 403/309; 411/372.5
See application file for complete search history.

(56) References Cited

U.S. PATENT DOCUMENTS

| 4,839,579 A * | 6/1989 | Ito et al. ............... 340/870.38 |
| 6,886,860 B1 * | 5/2005 | Singleton et al. ........... 280/779 |
| 2004/0154429 A1 * | 8/2004 | Rhea et al. .................. 74/558 |

* cited by examiner

*Primary Examiner*—Faye M. Fleming
(74) *Attorney, Agent, or Firm*—Morgan Lewis & Bockius LLP

(57) ABSTRACT

An impact absorption structure for a steering column cover for a vehicle, which is capable of minimizing injury to a driver's knee as well as driver's chest by achieving certain deformation in an impact absorption structure when a load is applied due to an impact on the steering column cover. The impact absorption structure is adapted to a bolt mounting structure in which upper and lower steering column covers are assembled using bolts.

4 Claims, 2 Drawing Sheets

IMPACT ABSORPTION STRUCTURE OF A STEERING COLUMN COVER FOR A VEHICLE

CROSS-REFERENCE TO RELATED APPLICATIONS

This application claims priority of Korean Application No. 10-2003-0060684, filed on Sep. 1, 2003, the disclosure of which is incorporated fully herein by reference.

FIELD OF THE INVENTION

The present invention relates to an impact absorption structure of a steering column cover for a vehicle, and, more particularly, an impact absorption structure of a steering column cover for a vehicle which is capable of minimizing injury to a driver by deforming an impact absorbing member when a certain load is applied due to an impact such as collision of a vehicle.

BACKGROUND OF THE INVENTION

Generally, a steering apparatus of a vehicle is designed to change a running direction of the vehicle. The steering apparatus includes an operation mechanism, a gear mechanism, and a link mechanism. The operation mechanism includes a steering column cover which includes a steering wheel that a driver directly handles, a steering shaft engaged with the steering wheel, and a tilting apparatus and telescopic apparatus engaged to a portion of the steering shaft and providing a certain convenience function needed for driving.

In addition, when a vehicle crashes during its running operation, the upper body of the driver hits the steering wheel because the driver is forwardly bent by inertial force, or hits a steering shaft engaged to the steering wheel that is upwardly moved toward the driver. In order to overcome the above problems, an impact absorption structure capable of absorbing impacts applied to the driver's knee is provided in the steering column coverre.

As an example of the impact absorption structure, according to the Korean utility model laid-open No. 1998-045194, there is provided an impact absorption apparatus of a vehicle steering column cover. An impact absorption shell formed of a buffering material is provided in an inner surface of a steering column cover corresponding to a position of a driver's knee for thereby effectively absorbing a direct impact with the steering shaft. When a vehicle crashes, the impact absorption shell installed in an inner surface of the steering column cover is deformed for thereby absorbing impact energy based on the deforming structure. The time from when the driver's knee crashes with the steering column cover to when the impact is actually applied is decreased for thereby decreasing the impact force.

However, in the conventional impact absorption structure of the steering column cover, when a driver's chest crashes with the steering wheel, the impact may be transferred to the steering column cover. In this case, the steering column cover is not deformed because it has a rigid structure. Namely, the conventional impact absorption structure of the steering column cover is designed to absorb only the impact applied to the driver's knee. There is not any method for absorbing the impact applied to the driver's chest.

In addition, according to the Japanese patent No. Hei 2-200570, there is provided a column cover in which the strength of the upper side of the cover is smaller than the strength of the lower portion of the cover. In the above patent, there is not any method for absorbing the impact applied to the driver's chest.

According to the Japanese patent laid-open No. Hei 6-247321, enhancement of an impact absorption is effected by changing the inner structure of the cover. A first impact absorbent and a second impact absorbent are provided in the interior of the cover. When a certain impact is applied, the first impact absorbent is destroyed, and then the second impact absorbent is destroyed thereby enhancing the ability to absorb the entire impact energy. In addition, according to the Japanese patent open laid-open No. Hei 6-298101, the cover is divided into the upper portion and the lower portion. The lower portion is fixed to the steering column bracket. A central shaft portion formed in the interior of the upper portion is combined with a central cylindrical portion formed in the interior of the lower portion, so that the upper portion is fixed to the lower portion.

However, in the above constructions, it is possible to enhance an impact energy absorption rate based on the structural characteristic of the cover, but the structures are so complicated.

SUMMARY OF THE INVENTION

Embodiments of the present invention provide an impact absorption structure of a steering column cover for a vehicle capable of preventing an impact from being transferred to a driver's chest. In preferred embodiments of the present invention, injury due to an impact is minimized through use of notches formed at a boss part of a steering column cover fixed to a steering shaft thereby inducing deformation in the boss part when an impact is applied. Thus impact applied to an upper body of a driver, namely, applied to a driver's chest is decreased.

In one embodiment of the present invention, a steering column cover comprises an upper column cover and a lower column cover. The lower column cover is provided with an impact absorption boss part protruded from the bottom surface thereof, wherein the impact absorption boss part is coupled with a bolt inserting part formed in the upper column cover by means of a bolt.

The boss part has a circular cross section with a bolt hole at the center of an upper surface thereof. Notches are formed on the circumference thereof at regular intervals. Support parts are defined by the notches. In addition, a recession is formed on the upper surface of the boss part, so that the bolt inserting part of the upper column cover can be firmly engaged thereto.

In a preferred embodiment of the present invention, the width of the notches can be adjusted in accordance with expected impact.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Hereinafter, such embodiments of the present invention are described in detail with reference to the accompanying drawings.

In the present invention, a damage due to an impact is minimized in such a manner that notches are formed in a boss part of a steering column cover 11 fixed to a steering shaft 10 for thereby inducing a certain deformation in the assembling structure when an impact is applied.

Figure 1:
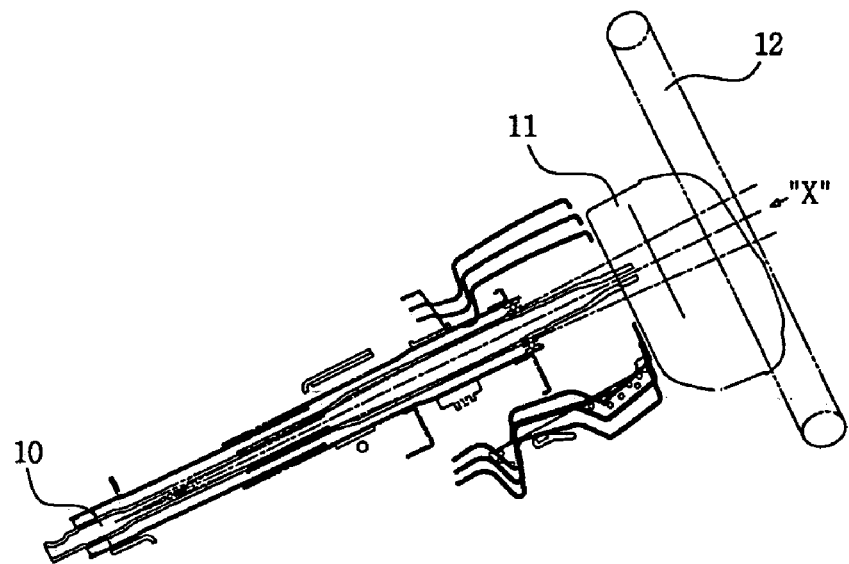
FIG. 1 is a lateral cross sectional view illustrating a steering shaft.
Figure 2:
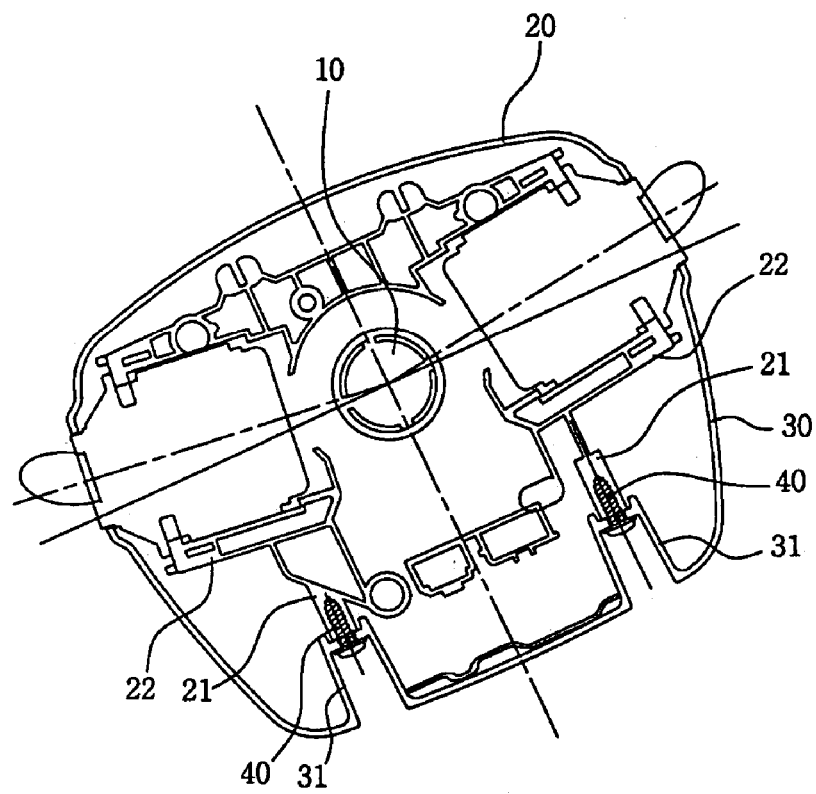
FIG. 2 is a plane cross sectional view illustrating an impact absorption structure of a steering column cover for a vehicle according to an embodiment of the present invention.

As shown in FIG. 1, the steering column cover 11 is a box shaped part in which a tilting apparatus, a telescopic apparatus, a key box and a multifunction switch are mounted. The steering column cover 11 is installed at a lower side of the steering wheel 12. As shown in FIG. 2, the steering column cover 11 is shaft-engaged by a bolt mounting structure of an impact absorption structure type according to an embodiment of the present invention.

In the bolt mounting structure, as an engaging part for coupling the upper column cover 20 and the lower column cover 30, a panel member 22 having a bolt inserting part 21 of the upper column cover 20 is provided in a lower direction of the steering column cover 11.

Figure 3:
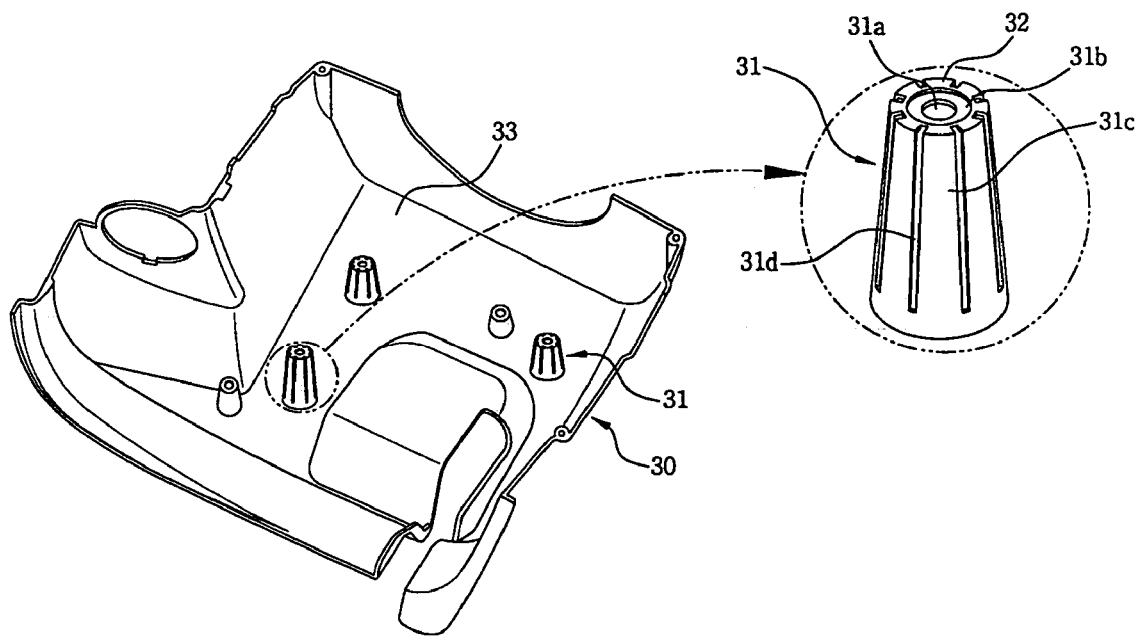
FIG. 3 is a perspective view illustrating an impact absorption structure of a steering column cover for a vehicle according to an embodiment of the present invention.
Figure 4:
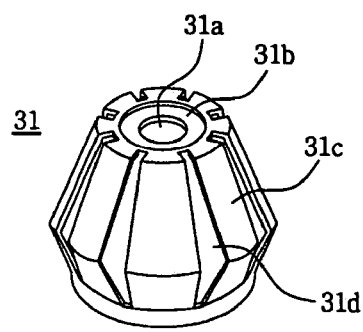
FIG. 4 is a perspective view illustrating deformation of an impact absorption structure of a steering column cover for a vehicle according to an embodiment of the present invention.

As shown in FIG. 3, in the lower column cover 30, a boss part 31 to be coupled with the bolt inserting part 21 by means of a bolt 40 is integrally protruded. Additionally, formed at the upper surface of the boss part 31 is a bolt hole 31a for insertion of the bolt 40.

The boss part 31 serves to absorb an impact caused by a collision of a vehicle so as to minimize injury to a driver. Here, a plurality of the boss parts 31 are provided on the cover surface 33 of the lower column cover 30.

In a preferred embodiment of the present invention, the boss part 31 protrudes with a certain height, and the cross section of the same is circular.

Preferably, the bolt hole 31a is located at the center of the boss part 31. A recess 31b with a certain depth is formed on an upper surface so that the bolt inserting part 21 of the upper column cover 20 can be firmly engaged thereto.

The boss part 31 comprises notches 31d formed on the circumference thereof at regular intervals and support parts 31c defined by said notches.

As a destroyable structure for absorbing the impact, the notch 31d is preferably made of a ductile material so that it is readily deformed when a certain level of impact is applied. In addition, the width of the notch 31d can be adjusted in accordance with required strength considering the impact of a collision.

As described above, the present invention is not necessary to provide an additional impact absorption shell unlike a conventional art. It enables to reduce manufacturing cost and to reduce the overall weight of a vehicle.

Hereinafter, the operation of the impact absorption structure of a steering column cover for a vehicle according to the present invention will be described.

When a collision occurs, a driver's upper body, namely, a driver's chest impacts against the steering wheel 12, and the impact is subsequently transferred to a steering column cover 11, resulting in deformation of the steering column cover 11. The boss part 31 of the bolt mounting structure is deformed by shear stress and compressive stress generated by impact of a driver's chest and a driver's knee, respectively. The support part 31c of the boss part 31 is outwardly bent by the compressive stress and then starts to deform. Thereafter, the deformation of the boss part 31 is expedited by the shear stress caused by impact of a driver's chest, and finally the boss part 31 is destroyed. By such deformation of the boss part 31, the impact applied to the driver's knee and chest is significantly reduced.

Therefore, in the impact absorption structure of a steering column cover for a vehicle according to the present invention, it is possible to enhance the performance of decreasing the impact applied to the driver's knee and the impact applied to the driver's chest.

As descried above, in the impact absorption structure of a steering column cover according to the present invention, it is possible to minimize the impact applied to the driver's knee and chest. The conventional impact absorption shell is not needed in the present invention, so that it is possible to decrease a fabrication cost.

What is claimed is:

1. A steering column cover for a vehicle having an upper column cover and a lower column cover comprising:
   a bolt inserting part formed in the upper column cover; and
   an impact absorption boss part protruding from the lower column cover and comprising:
      a bolt hole at a center of an upper surface of the boss part;
      notches formed on a circumference of the boss part at regular intervals; and
      support parts defined by said notches;
   wherein said bolt inserting part and said impact absorption boss part are securely coupled by means of a bolt.

2. The steering column cover according to claim 1, wherein the boss part further comprises a recess formed on the upper surface of the boss part so that the bolt inserting part of the upper column cover can be firmly engaged thereto.

3. The steering column cover according to claim 2, wherein a width of the notches can be adjusted in accordance with required impact strength.

4. A steering column cover for a vehicle having an upper column cover and a lower column cover comprising:
   a bolt inserting part formed in the upper column cover; and
   an impact absorption boss part protruding from the lower column cover and comprising notches on a circumference of the boss part;
      wherein a width of the notches can be adjusted in accordance with required impact strength;
   wherein said bolt inserting part and said impact absorption boss part are securely coupled by means of a bolt.

* * * * *